United States Patent
Clarke et al.

(10) Patent No.: US 11,028,460 B2
(45) Date of Patent: Jun. 8, 2021

(54) SYSTEMS AND METHODS FOR RECOVERY OF LEAD FROM LEAD ACID BATTERIES

(71) Applicant: Aqua Metals Inc., Alameda, CA (US)

(72) Inventors: Robert Lewis Clarke, Orinda, CA (US); Brian Dougherty, Emeryville, CA (US); Richard Clarke, Orinda, CA (US); Samaresh Mohanta, San Diego, CA (US)

(73) Assignee: AQUA METALS INC., Alameda, CA (US)

( * ) Notice: Subject to any disclaimer, the term of this patent is extended or adjusted under 35 U.S.C. 154(b) by 426 days.

(21) Appl. No.: 15/573,356

(22) PCT Filed: May 13, 2016

(86) PCT No.: PCT/US2016/032332
§ 371 (c)(1),
(2) Date: Nov. 10, 2017

(87) PCT Pub. No.: WO2016/183428
PCT Pub. Date: Nov. 17, 2016

(65) Prior Publication Data
US 2018/0127852 A1    May 10, 2018

Related U.S. Application Data (60) Provisional application No. 62/160,844, filed on May 13, 2015.

(51) Int. Cl.
*C25C 1/00* (2006.01)
*C22B 3/00* (2006.01)
(Continued)

(52) U.S. Cl.
CPC .............. *C22B 13/045* (2013.01); *C25B 1/22* (2013.01); *C25B 15/08* (2013.01); *C25C 1/18* (2013.01);
(Continued)

(58) Field of Classification Search
CPC .... C25C 1/18; C25C 1/00; C25C 7/00; C25C 7/08
(Continued)

(56) References Cited

U.S. PATENT DOCUMENTS

| 1,148,062 A | 7/1915 | Tucker et al. |
| 1,334,419 A | 3/1920 | Tainton |

(Continued)

FOREIGN PATENT DOCUMENTS

| CA | 1308057 | 9/1992 |
| CA | 1310837 | 12/1992 |

(Continued)

OTHER PUBLICATIONS

Notification of the First Office Action for China Application No. 201680080516.9, dated Jul. 2, 2019, 09 Pages.
(Continued)

*Primary Examiner* — Zulmariam Mendez
(74) *Attorney, Agent, or Firm* — Umberg Zipser LLP (57) ABSTRACT

Lead is recovered from lead paste of a lead acid battery in a continuous process. The lead paste is contacted with a base to generate a supernatant and a precipitate. The precipitate is separated from the supernatant, and is contacted with an alkane sulfonic acid to generate a mixture of lead ion solution and insoluble lead dioxide. The lead dioxide is reduced with a reducing agent to form lead oxide, and the lead oxide is combined with the lead ion solution to form a combined lead ion solution to so allow a continuous process (Continued)

without lead dioxide accumulation. Lead is recovered from the combined lead ion solution using electrolysis.

14 Claims, 2 Drawing Sheets

(51) Int. Cl.
| | |
|---|---|
| C25C 1/18 | (2006.01) |
| H01M 10/06 | (2006.01) |
| H01M 10/54 | (2006.01) |
| C25B 15/08 | (2006.01) |
| C25B 1/22 | (2006.01) |

(52) U.S. Cl.
CPC ........... *H01M 10/06* (2013.01); *H01M 10/54* (2013.01); *Y02P 10/20* (2015.11); *Y02W 30/84* (2015.05)

(58) Field of Classification Search
USPC ........................................................ 205/599
See application file for complete search history.

(56) References Cited

U.S. PATENT DOCUMENTS

| | | |
|---|---|---|
| 1,752,356 A | 4/1930 | Smith et al. |
| 1,759,494 A | 5/1930 | Tainton |
| 1,911,604 A | 5/1933 | Calbeck |
| 1,942,208 A | 1/1934 | Gamichon |
| 2,166,367 A | 7/1939 | Norris |
| 2,655,472 A | 10/1953 | Hilliard et al. |
| 3,153,590 A | 10/1964 | Storchheim |
| 3,262,868 A | 7/1966 | Juda |
| 3,395,010 A | 7/1968 | Shoeld |
| 3,616,277 A | 10/1971 | Adamson |
| 3,647,545 A | 3/1972 | Mao |
| 3,772,003 A | 11/1973 | Gordy |
| 3,860,509 A | 1/1975 | Emmett, Jr. |
| 4,035,242 A | 7/1977 | Brandt |
| 4,097,354 A | 6/1978 | Ginatta |
| 4,107,007 A | 8/1978 | Gaumann et al. |
| 4,118,219 A | 10/1978 | Elmore et al. |
| 4,128,460 A | 12/1978 | Nishimura et al. |
| 4,159,231 A | 6/1979 | Smith et al. |
| 4,222,769 A | 9/1980 | Okuda et al. |
| 4,229,271 A | 10/1980 | Prengaman et al. |
| 4,269,810 A | 5/1981 | Kolakowski |
| 4,460,442 A | 7/1984 | Ducati |
| 4,650,553 A | 3/1987 | Felgendreger et al. |
| 4,652,349 A | 3/1987 | Behringer et al. |
| 4,769,116 A | 9/1988 | Olper et al. |
| 4,773,978 A | 9/1988 | Thomassen et al. |
| 4,849,059 A | 7/1989 | Deresh et al. |
| 4,927,510 A | 5/1990 | Olper et al. |
| 4,944,851 A | 7/1990 | Cordani et al. |
| 5,106,466 A | 4/1992 | Olper et al. |
| 5,124,008 A | 6/1992 | Rendall et al. |
| 5,211,818 A | 5/1993 | Moure, Jr. et al. |
| 5,230,779 A | 7/1993 | Martin |
| 5,262,020 A | 11/1993 | Masante et al. |
| 5,429,661 A | 7/1995 | Khodov et al. |
| 5,514,263 A | 5/1996 | Spijkerman et al. |
| 5,520,794 A | 5/1996 | Gernon |
| 5,750,019 A | 5/1998 | Olper |
| 5,827,347 A | 10/1998 | Margulis |
| 5,928,488 A | 7/1999 | Newman |
| 6,183,619 B1 | 2/2001 | Gillman et al. |
| 6,428,676 B1 | 8/2002 | Onuoha |
| 6,679,471 B2 | 1/2004 | Domeier et al. |
| 6,860,983 B2 | 3/2005 | Bellino et al. |
| 7,368,043 B2 | 5/2008 | Mohanta et al. |
| 7,507,496 B1 | 3/2009 | Kinsbursky et al. |
| 8,323,595 B1 | 12/2012 | Smith et al. |
| 8,409,421 B2 | 4/2013 | Olper et al. |
| 8,580,414 B2 | 11/2013 | Clarke |
| 2004/0004003 A1 | 1/2004 | Hesse |
| 2004/0140222 A1 | 7/2004 | Smedley et al. |
| 2004/0222085 A1 | 11/2004 | Mohanta et al. |
| 2006/0091017 A1 | 5/2006 | Lam |
| 2008/0128293 A1 | 6/2008 | Mohanta et al. |
| 2010/0043600 A1 | 2/2010 | Martini |
| 2011/0033760 A1 | 2/2011 | Clarke |
| 2011/0083970 A1 | 4/2011 | Olper et al. |
| 2011/0265969 A1 | 11/2011 | Liu et al. |
| 2014/0131219 A1 | 5/2014 | Fassbender et al. |
| 2014/0131220 A1 | 5/2014 | Fassbender et al. |
| 2015/0368750 A1 | 12/2015 | Spence |
| 2016/0294024 A1 | 10/2016 | Clarke et al. |
| 2016/0308261 A1 | 10/2016 | Tyagi et al. |
| 2017/0159191 A1 | 6/2017 | Clarke et al. |
| 2017/0352927 A1 | 12/2017 | Dougherty et al. |
| 2018/0069276 A1 | 3/2018 | Clarke et al. |
| 2018/0127888 A1 | 5/2018 | Clarke et al. |
| 2018/0355494 A1 | 12/2018 | Clarke et al. |

FOREIGN PATENT DOCUMENTS

| | | |
|---|---|---|
| CN | 1470675 A | 1/2004 |
| CN | 1846005 A | 10/2006 |
| CN | 101012514 A | 8/2007 |
| CN | 101250720 A | 8/2008 |
| CN | 101335370 A | 12/2008 |
| CN | 101899576 A | 12/2010 |
| CN | 101918600 A | 12/2010 |
| CN | 101956214 A | 1/2011 |
| CN | 102146572 A | 8/2011 |
| CN | 102560535 B | 7/2012 |
| CN | 102618884 A | 8/2012 |
| CN | 103509949 A | 1/2014 |
| CN | 104039991 A | 9/2014 |
| CN | 104532302 A | 4/2015 |
| CN | 105981212 A | 9/2016 |
| CN | 107112606 A | 8/2017 |
| EP | 0038366 | 10/1981 |
| EP | 0724306 | 7/1996 |
| FR | 2207997 A1 | 6/1974 |
| IN | 59250 | 12/1957 |
| JP | 5493626 | 7/1979 |
| JP | 5848645 | 3/1983 |
| JP | S624892 A | 1/1987 |
| JP | H9-13189 A | 1/1997 |
| JP | 2001017942 A | 1/2001 |
| SU | 1151595 A | 4/1985 |
| SU | 1675393 A1 | 9/1991 |
| WO | 9214866 A1 | 9/1992 |
| WO | 9533756 | 12/1995 |
| WO | 9966105 A1 | 12/1999 |
| WO | 2007044852 | 4/2007 |
| WO | 2008044852 A1 | 4/2008 |
| WO | 2013152260 | 10/2013 |
| WO | 2014076544 | 5/2014 |
| WO | 2014076547 | 5/2014 |
| WO | 2015057189 A1 | 4/2015 |
| WO | 2015077227 A1 | 5/2015 |
| WO | 2015084950 | 6/2015 |
| WO | 2016081030 A1 | 5/2016 |
| WO | 2016130675 A1 | 8/2016 |
| WO | 2016/183428 | 11/2016 |
| WO | 2016183429 A1 | 11/2016 |
| WO | 2016183431 A1 | 11/2016 |
| WO | 2017096209 A1 | 6/2017 |

OTHER PUBLICATIONS

U.S. Pat. No. 292,753, Jan. 29, 1884, Kessler et al. (IDS form would not accept number under U.S. Patents).
International Preliminary Report on Patentability for PCT application No. PCT/US2016/032332 dated Sep. 4, 2017; 25 pgs.
International Search Report and Written Opinion for PCT application No. PCT/US2016/032332 dated Sep. 12, 2016; 18 pgs.

(56) References Cited

OTHER PUBLICATIONS

Atanasova et al., "Desulpherization of lead cake by sodium carbonate and sodium hydroxide," Journal of the University of Chemical Technology and Metallurgy, 2008; 43(2):267-272.
Bandanoiu et al., Study Concerning PbO Solubility in NaOH Solution for the Treatment of Sulfate-oxide Pastes Obtained from Dismantling used Leadacid Batteries, ResearchGate, https://www.researchgate.net/publication/259571644_Study_Concerning_PbO_Solubility_in_NaOH_Solution_for_the_Treatment_of_Sulfate-oxide_Pastes_Obtained_from_Dismantling_used_Lead-acid_Batteries, Jan. 2013, vol. 64, No. 9, pp. 1004-1010.
Birk, "Lead, Pb2+", http://www.public.asu.edu/~jpbirk/qual/qualanal/lead.html, Feb. 2002, accessed on May 9, 2018, evidence of existence as prior art supported by https://web.archive.org/web/20020209174305/http://www.public.asu.edu/~jpbirk/qual/qualanal/lead.html.
Genders, David, "Electrochemical Salt Splitting," Electrosynthesis, Watts New Quarterly Newsletter, Sep. 1995: 1(1); 8 pgs.
Jordan, Manfred, "Chapter 8—Electrodeposition of Lead and Lead Alloys," Modern Electroplating, Fifth Edition; 2010 John Wily & Sons, Inc.; pp. 249-263.
Li et al., "Electrodeposited lead dioxide coatings," Chem Soc Rev, 2011; 40:3879-3894.
Madkour, "Electrolytic separation of lead and its dioxide from carbonate ore residiuum," Indian Journal of Chemical Technology, Nov. 1995; 2:343-344.
Malak et al., "Comparative analysis of two processes for desulphurization of battery paste," JAMME, vol. 55, Issue 2, Dec. 2012, pp. 855-859.
Nguyen et al., "More Environmental Friendly Method of Lead Recycling From Waste Battery Paste—An Electrochemical Investigation," Annual Report of FY 2002, The Core University Program between Japan Society for the Promotion of Science (JSPS) and National Centre for Natural Science and Technology (NCST) p. 38-p. A5.
Pletcher et al., "A novel flow battery—A lead-acid battery based on an electrolyte with soluble lead(II): V. Studies of the lead negative electrode," Journal of Power Sources, May 2008;180(1):621-629.
Sun, et al., "Structural and Morphological Evolution of Lead Dendrites during Electrochemical Migration," Scientific Reports, Nov. 15, 2013; 3(3227); 6 pgs.
Tyagi, A zero lead pollution and economical recycling process for lead-acid batteries utilizing electrowinning in basic medium, 4th International Lead Conference, http://4islc.conferenceworks.com.au/presentations/a-zero-lead-pollution-and-economical-recycling-process-for-lead-acid-batteries-utilizing-electrowinning-in-basic-medium/, Downloaded Oct. 13, 2015, 2 pages.
Vaysgant et al., "A low-temperature technique for recycling lead/acid battery scrap without wastes and with improved environmental control," Journal of Power Sources, Feb. 1995; 53(2):303-306.
Wong et al., "Lead electrodeposition from very alkaline media," Electrochemica Acta, Nov. 2005; 51(4):619-626.
Walsh, et al. "Versatile electrochemical coatings and surface layers from aqueous methanesulfonic acid," Surface & Coatings Technology, 2014; 259:676-697.
Buzatu et al., "Processing oxidic waste of lead-acid batteries in order to recover lead," Asia-Pac. J. Chem. Eng., 2015; 10:125-132.
Gircis et al., "Electrochemical phenomena in aqueous electrowinning of lead," Journal of Applied Electrochemistry, 1987; 17:1234-1245.
Lyakov et al., "Desulphurization of damped battery paste by sodium carbonate and sodium hydroxide," Journal of Power Sources, 2007; 171:960-965.
Wu et al., "Fundamental study of lead recovery from cerussite concentrate with methanesulfonic acid (MSA)," Hydrometallurgy, 2014; 142:23-35.
Buzatu et al., "Studies on mathematical modeling of the leaching process in order to efficiently recover lead from the sulfate/oxide lead paste," Waste Management, Feb. 2017; 60:723-733.
Carlos, et al., "Study of the influence of glycerol on the cathodic process of lead electrodeposition and on its morphology," J. Power Sources, Jan. 2001; 92:56-64.
Carlos et al., "Voltammetric study of lead electrodeposition in the presence of sorbitol and morphological characterization," May 2003; 117:179-186.
Carlos, et al., "Voltammetric and morphological study of lead electrodeposition on copper substrate for application of a lead-acid batteries," J. Power Sources, May 2004; 132(1-2):261-265.
International Preliminary Report on Patentability for Application No. PCT/US2014/066142, dated Mar. 8, 2016; 43 pgs.
International Search Report and Written Opinion for Application No. PCT/US2014/066142, dated Mar. 24, 2015; 16 pgs.
International Preliminary Report on Patentability for Application No. PCT/US2016/032334, dated Aug. 28, 2017; 14 pgs.
International Search Report and Written Opinion for Application No. PCT/US2016/032334, dated Sep. 12, 2016; 17 pgs.
Second Written Opinion for Application No. PCT/US2016/032334, dated May 22, 2017; 4 pgs.
International Preliminary Report on Patentability for Application No. PCT/US2016/032338, dated May 19, 2017; 7 pgs.
International Search Report and Written Opinion for Application No. PCT/US2016/032338, dated Oct. 21, 2016; 17 pgs.
International Preliminary Report on Patentability for Application No. PCT/US2015/030626, dated Mar. 7, 2017; 12 pgs.
International Search Report and Written Opinion for Application No. PCT/US2015/030626, dated Sep. 10, 2015; 16 pgs.
International Preliminary Report on Patentability for Application No. PCT/US2016/064697, dated Feb. 19, 2018; 18 pgs.
International Search Report and Written Opinion for Application No. PCT/US2016/064697, dated Mar. 10, 2017; 14 pgs.
Ferracin et al., "Lead recovery from a typical Brazilian sludge of exhausted lead-acid batteries using an electrohydrometallurgicalprocess," Hydrometallurgy, Sep. 2002; 65(2-3):137-144.
Sonmez et al., "Leaching of waste battery paste components. Part 1: Lead citrate synthesis form PbO and PbO2," Hydrometallurgy, Jan. 2009; 95(1-2);53-60.
Evertsson et al., "The thickness of native oxides on aluminum alloys and single crystals," Applied Surface Science, Sep. 2015; 349:826-832.
Liu et al., "Preparation of porous Pb electrode with electrodeposition and its electrocatalytic property of CO2 reduction," Modern Chemical Industry, Sep. 2012; 32(9):43-47.

SYSTEMS AND METHODS FOR RECOVERY OF LEAD FROM LEAD ACID BATTERIES

This application claims priority to U.S. Provisional Application Ser. No. 62/160,844, filed May 13, 2015. All extrinsic materials identified herein are incorporated by reference in their entirety.

FIELD OF THE INVENTION

The field of the invention is recycling of lead acid batteries and other lead sulfate containing waste.

BACKGROUND

The background description includes information that may be useful in understanding the present invention. It is not an admission that any of the information provided herein is prior art or relevant to the presently claimed invention, or that any publication specifically or implicitly referenced is prior art.

Various efforts have been made to move away from smelting operations in recycling lead acid batteries (LABs) and to use more environmentally friendly solutions. For example, U.S. Pat. No. 4,927,510 teaches recovering substantially all lead in pure metal form from battery sludge after a desulfurization process. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. In another example, Canadian Patent No. 1,310,837 also teaches recovering lead in metal form from a desulfurized paste. The paste is leached with an acid suitable for electrowinning and insoluble $PbO_2$ is reduced using hydrogen peroxide. Unfortunately, the '510 patent and the '837 patent require use of a fluorine containing electrolyte (e.g., fluoboric or fluosilic acid), which is equally problematic.

To overcome some of the difficulties associated with fluorine containing electrolyte, desulfurized lead active materials have been dissolved in methane sulfonic acid as described in U.S. Pat. Nos. 5,262,020 and 5,520,794. However, as lead sulfate is rather poorly soluble in methane sulfonic acid, upstream pre-desulfurization is still necessary and residual insoluble materials typically reduced the overall yield to an economically unattractive process. To improve at least some of the aspects associated with lead sulfate, oxygen and/or ferric methane sulfonate can be added as described in International Patent Application Publication No. WO 2014/076544, or mixed oxides can be produced as taught in International Patent Application Publication No. WO 2014/076547. However, despite the improved yield, several disadvantages nevertheless remain. Among other things, solvent reuse in these processes often requires additional effort, and residual sulfates are still lost as waste product. Moreover, during process interruptions (such as power outages—which are not uncommon in electrolytic lead recovery) the plated metallic lead will dissolve back into the electrolyte, unless the cathode is removed and the lead peeled off. This renders batch operation at best problematic.

U.S. Pat. No. 8,409,421 teaches an electrolytic process for recovering lead from desulfurized lead paste. The lead paste is leached with a solution comprising ammonium chloride to form a two-phase reaction product. The solid phase of the reaction product is leached with hydrogen peroxide to reduce insoluble $PbO_2$ and form a second two-phase reaction product. The liquid phases of the two reactions products are subject to electrolysis to form spongy lead. However, the '421 patent teaches that $CO_2$ is produced in the first leaching step and that it is necessary to add ammonia and water during electrolysis to make up for consumed ammonia and evaporated water in the electrolysis step, which can be problematic.

Recently, as described in copending International Patent Publication No. WO 2015/077227, it has been found that the inclusion of chelating agents with solvents (e.g., EDTA) such as MSA at acidic pH improves the solubility of lead oxides and lead sulfate salts, permitting recovery of lead by electrodeposition from such solvent systems. However, the breakdown of EDTA during electrodeposition and accumulation of sulfates in the solvent system limits the ability to re-use such solvents without continued replenishment of EDTA.

Thus, even though numerous methods for lead recycling are known in the art, all or almost all of them, suffer from one or more disadvantages. Most notably, environmental concerns in using harmful leaching agents or producing harmful gases, and the inefficiencies in having a discontinuous recycling process have prevented commercially relevant recycling systems. Therefore, there is still a need for improved devices and method for smelterless recycling of lead acid batteries, especially in a continuous manner.

SUMMARY OF THE INVENTION

The inventive subject matter provides apparatus, systems, and methods that permit simple and effective isolation of lead from lead acid batteries during recycling operations that advantageously reduces environmental concerns of using harmful leaching agents and producing harmful gases, and increases efficiency by providing a continuous process. Lead is recovered from a lead paste (which typically includes $PbSO_4$, $PbO$, and $PbO_2$) of a lead acid battery. The lead paste is contacted with a base to thereby generate a supernatant comprising a soluble sulfate salt and a precipitate comprising an insoluble lead salt. The base essentially converts all lead species into corresponding lead oxides and so allows complete removal of sulfate from the lead paste.

The supernatant is separated from the precipitate. It should be particularly appreciated that all lead species are initially recovered as the corresponding insoluble oxides/hydroxides while substantially all of the sulfate is removed in a liquid phase (e.g., as $Na_2SO_4$). The precipitate is treated with alkane sulfonic acid to generate a mixture comprising a lead ion solution and insoluble lead dioxide. Thus, the alkane sulfonic acid is used to dissolve precipitated lead species, but considerable amounts of lead dioxide remain undissolved. The insoluble lead dioxide is contacted with a reducing agent to thereby reduce lead dioxide to lead oxide, and the lead oxide is combined with the lead ion solution to form a combined lead ion solution. An electrical potential is applied to a cathode in contact with the combined lead ion solution to thereby continuously form adherent lead on the cathode while regenerating alkane sulfonic acid, which can be reused to treat additional precipitate comprising an insoluble lead salt. The adherent lead is removed from a second portion of the cathode while continuously forming adherent lead on a first portion of the cathode. As used herein, the term "adherent" when used in conjunction with lead formed by reduction of ionic lead refers to a form of lead that is not a coherent film bound to a surface of the cathode, but that is amorphous and can be wiped or rinsed off the cathode. In other words, an adherent lead product does not form in a macroscopic dimension intermetallic bonds between the cathode and the lead product and will therefore not form a coherent lead film on the cathode. Thus, a continuous process for lead recovery is contemplated that reduces environmental concerns of using harmful leaching agents and producing harmful gases, and increases efficiency by providing a continuous process.

In some embodiments, base is added in an amount sufficient to produce the supernatant comprising the soluble sulfate salt and the precipitate comprising the insoluble lead salt without substantial production of plumbate (i.e., less than 0.1 mol % of the incoming lead species in the lead paste). Typically, the base comprises at least one of an alkali or alkaline earth metal hydroxide and a carbonate, and the insoluble lead salt comprises at least one of a lead oxide, a lead hydroxide, and a lead carbonate. For example, the soluble sulfate salt can comprise sodium sulfate, the base can comprise sodium hydroxide, and the insoluble lead salt can comprise lead hydroxide.

The supernatant can be separated from the precipitate by at least one of settling, centrifugation, and filtration. It is contemplated that the insoluble lead salt in the precipitate is substantially free of sulfate. In typical embodiments, the insoluble lead salt comprises between 0.01-0.1% w/w sulfate, 0.1-1% w/w sulfate, or 1-5% w/w sulfate. The supernatant can be subject to electrolysis in an electrochemical cell to produce a regenerated base, a recyclable water and sulfuric acid. It should be appreciated that the regenerated base can be used to treat additional lead paste to convert lead species in the lead paste into corresponding lead oxides, and the recyclable water can be reused in the electrochemical cell or in another process.

The precipitate is contacted with alkane sulfonic acid to generate a mixture comprising a lead ion solution and insoluble lead dioxide. In typical embodiments, the alkane sulfonic acid comprises methanesulfonic acid. The insoluble lead dioxide can be treated with a reducing agent to convert the lead dioxide to lead oxide. Suitable reducing agents include, but are not limited to, hydrogen peroxide, dicarboxylic acid, metallic lead, sulfite, hydrazine sulfate, or sodium dithionate. Thus, it should be appreciated that reducing insoluble lead dioxide to lead oxide and combining the lead oxide with the lead ion solution allows for increased recovery of lead and advantageously avoids accumulation of insoluble lead dioxide in the continuous process.

The lead oxide formed by reducing the insoluble lead dioxide can be combined with the lead ion solution in a number of suitable manners. For example, the lead oxide can be fed directly to the lead ion solution to form the combined lead ion solution. In another example, the lead oxide can be contacted with a second portion of the alkane sulfonic acid to thereby generate a second lead ion solution, and the lead ion solution and the second lead ion solution can be combined to form the combined lead ion solution. Thus, it is contemplated that lead oxide can be directly or indirectly fed to the lead ion solution to form the combined lead ion solution. It should be appreciated that undissolved material in the combined lead ion solution is typically removed prior to feeding the combined lead ion solution to the electrochemical cell. Such undissolved material comprises at least one of metallic lead and plastic.

The combined lead ion solution is fed to an electrochemical cell. An electrical potential is applied to a cathode in contact with the combined lead ion solution to form lead. The cathode can comprise aluminum, an aluminum alloy, or an aluminum powder embedded in a plastic. In some embodiments, the cathode moves relative to the combined lead ion solution while the electrical potential is applied. For example, the cathode can exhibit rotational movement while the electrical potential is applied, such that the lead deposited on the cathode is removed from the lead ion solution. To remove the lead, a scraper can be positioned near or at the second portion of the cathode. Thus, lead can be continuously formed and removed at the cathode to provide a continuous lead recovery operation.

In another aspect, a method of recycling lead from a lead paste of a lead acid battery is contemplated. The method comprises contacting the lead paste with a base to thereby generate a supernatant comprising a soluble sulfate salt and a precipitate comprising an insoluble lead salt. The supernatant is separated from the precipitate. At least some of the base is regenerated from the supernatant using a first electrochemical cell, which advantageously reduces the need for external base for contacting the lead paste. The precipitated is contacted with a regenerated alkane sulfonic acid to generate a mixture comprising a lead ion solution and an insoluble lead dioxide.

To increase recovery of lead in the process, insoluble lead is contacted with a reducing agent to thereby convert lead dioxide to lead oxide, and the lead oxide is combined with the lead ion solution to form a combined lead ion solution. The combined lead ion solution is subjected to an electrical potential in a second electrochemical cell to thereby continuously form lead on a moving cathode and to generate the regenerated alkane sulfonic acid. Lead is collected from a second portion of the cathode while continuously forming lead on the first portion of the cathode for manufacturing a new lead acid battery. Thus, it should be appreciated that the base and alkane sulfonic acid can be regenerated to eliminate, or substantially reduce, the need for external sources in a continuous lead recovery operation.

In yet another aspect, a method of recycling lead from a desulfurized lead paste of a lead acid battery in a continuous process. The desulfurized lead paste is contacted with an alkane sulfonic acid to generate a mixture comprising a lead ion solution and an insoluble lead dioxide. The insoluble lead dioxide is separated from the lead ion solution, and is converted to lead oxide. The lead oxide is combined with the lead ion solution to form a combined lead ion solution. An electrical potential is applied to a cathode in contact with the combined lead ion solution to thereby continuously form adherent lead on a first portion of the cathode and to generate regenerated alkane sulfonic acid. Lead is removed from a second portion of the cathode while continuously forming lead on the first portion of the cathode. It should be appreciated that the insoluble lead dioxide is converted to lead oxide in an amount sufficient to avoid accumulation of the insoluble lead dioxide in the continuous process. Alternatively, lead dioxide can be periodically removed as a commodity or a value product.

In another aspect, a method of recovering lead from a lead paste of a lead acid battery is contemplated. The lead paste typically comprises lead sulfate and lead dioxide. The lead paste is contacted with a reducing agent reduce lead dioxide to lead oxide and thereby form a pre-treated lead paste. The pre-treated paste is contacted with a base to thereby generate a supernatant comprising a soluble sulfate salt and a precipitate comprising an insoluble lead salt. The supernatant is separated from the precipitate. The precipitate is contacted with alkane sulfonic acid to generate a lead ion solution. An electrical potential is applied to a cathode in contact with the lead ion solution to thereby continuously form adherent lead on a first portion of the cathode and to generate regenerated alkane sulfonic acid. Adherent lead is removed from a second portion of the cathode while continuously forming adherent lead on the first portion of the cathode. Thus, unlike many of the processes described above, lead dioxide is advantageously reduced to lead oxide prior to desulfurization in a continuous lead recycling operation.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventors have now discovered that lead from lead paste can be electrolytically recovered in a conceptually simple and effective manner using a alkaline desulfurization process in which lead paste (which includes $PbSO_4$, PbO, and $PbO_2$) is reacted with a base to convert the lead species into the corresponding insoluble lead salts that form a precipitate and to produce a sulfate solution that is then separated from the precipitate. The precipitate is contacted with alkane sulfonic acid (e.g., methanesulfonic acid) to generate a mixture of a lead ion solution and an insoluble lead dioxide. The insoluble lead dioxide is reduced to lead oxide (e.g., using sodium sulfite or hydrogen peroxide) and recycled to the lead ion solution to form a combined lead ion solution. Pure lead is recovered from the combined lead ion solution on a cathode in a continuous operation whereby adherent lead is formed on a first portion of the cathode while adherent lead is removed from a second portion of the cathode.

One should appreciate that the disclosed subject matter provides many advantageous technical effects including avoiding lead dioxide accumulation while forming and recovering lead in a continuous operation. Insoluble lead dioxide is reduced to lead oxide and recycled to the lead ion solution to decrease accumulation of insoluble lead dioxide, which advantageously also increases the yield of lead in the continuous lead recovery operation. Viewed from another perspective, the disclosed subject matter provides regeneration of a base used for the alkaline desulfurization process and regeneration of alkane sulfonic acid for treating a precipitate of a lead paste to thereby reduce, or eliminate, external sources of base and alkane sulfonic acid in a less costly and more efficient process. Additionally, generated sulfuric acid and recovered lead from the process of the disclosed subject matter can be used to manufacture new lead acid batteries. It should also be appreciated that the systems and methods of the inventive subject matter does not depend on smelting techniques.

Figure 1:
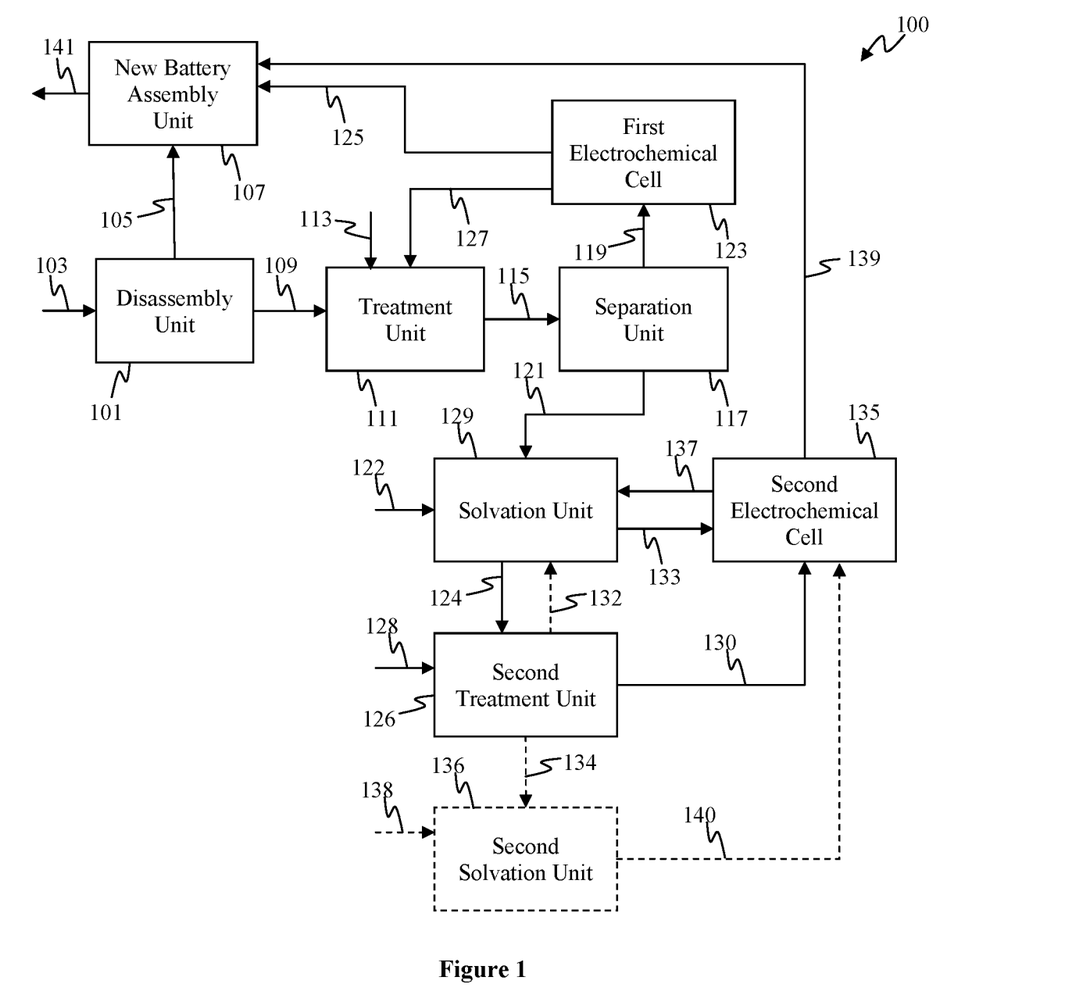
FIG. 1 is an exemplary schematic of an embodiment of lead acid battery processing according to the inventive subject matter.

An embodiment of the inventive concept is depicted schematically in FIG. 1. A system 100 comprises a disassembly unit 101 that receives a lead acid battery 103 for recycling. Disassembly unit 101 can be ordered, for example by splitting or cutting along edges and/or seams of a lead acid battery case. Alternatively, disassembly can be carried out by crushing, grinding, fragmenting, and/or shredding. Liquid and solid (e.g., plastic, metallic lead, lead paste) components produced in disassembly unit 101 can be separated by decantation and/or density separation. Plastic components, sulfuric acid solution, and metallic lead (Pb(0)) in the form of grids 105 can be recovered directly in a form that is substantially ready for reuse and sent to a new battery assembly unit 107. Insoluble lead paste 109 containing active material lead species is collected for further treatment in a treatment unit 111. Insoluble lead paste 109 typically comprises lead oxides and lead sulfate (e.g., 12-16 mol % PbO, 18-25 mol % $PbO_2$, 54-60 mol % $PbSO_4$, 1-3 mol % Pb).

Insoluble lead paste 109 is mixed with a base 113 to thereby generate a two-phase reaction product 115 that includes a supernatant and a precipitate. Suitable bases include, but are not limited to, an alkali or alkaline earth metal hydroxide ($M_x(OH)_y$) for which the corresponding metal sulfate ($M_a(SO_4)_b$) is soluble. For example, Group I metal hydroxides LiOH, NaOH, and KOH are contemplated as base 113. In another example, insoluble lead paste 109 is mixed with NaOH to thereby generate a supernatant comprising sodium sulfate and a precipitate comprising an insoluble lead salt (insoluble lead oxides and lead hydroxide) that is essentially free of sulfate. Other suitable bases that provide soluble sulfate salts (i.e. soluble at greater than or equal to 10, 25, 50, 75, 100, 200, 400, 600, or 800 or more g/L) and relatively insoluble (i.e. insoluble at 10, 3, 1, 0.3, 0.1, 0.03, 0.01 or less g/L) lead salts on reaction with $Pb(SO_4)$, for example carbonates (such as $Na_2(CO_3)$ and $K_2(CO_3)$), are also suitable. In typical embodiments, base is added to insoluble lead paste 109 in sufficient quantities as to form a precipitate comprising an insoluble lead salt without formation of plumbate (i.e., less than 0.1 mol % of the incoming lead species in insoluble lead paste 109).

A separation unit 117 is configured to separate two-phase reaction product 115 into a supernatant 119 having a soluble sulfate salt and a precipitate 121 having an insoluble lead salt. Separation of supernatant 119 from precipitate 121 can be performed by any suitable method. For example, supernatant 119 can be separated from precipitate 121 by settling via a settler, centrifugal separation (for example in a hydrocyclone) via a centrifuge, and/or filtration via a filtration unit. Suitable filters include filtration membranes and meshes, bed filters, press filters, and belt filters. Preferred separation methods are selected to efficiently separate precipitate 121 from supernatant 119 while facilitating recovery of precipitate 121 for subsequent processing. It should thus be particularly appreciated that lead sulfate is split into two value components, precipitate 121 comprising substantially sulfate free lead, and supernatant 119 comprising a substantially lead free sulfate solution.

Following separation from precipitate 121, it should further be recognized that supernatant 119 can be electrolytically processed to generate sulfuric acid, recyclable water and regenerate the base used in the treatment of insoluble lead paste 109 recovered from the recycled battery. This can be accomplished through the use of a first electrochemical cell 123. As shown in FIG. 1, first electrochemical cell 123 is fluidly coupled to separation unit 117 and configured to receive supernatant 119 and electrolytically generate sulfuric acid 125, recyclable water, and a base 127 from supernatant 119. It should be appreciated that such a process advantageously reuses sulfur from lead sulfate of insoluble lead paste 109 as sulfuric acid 125, which is an essential component of LABs, while also generating a base 127 that can be utilized in the recovery process (e.g., in treatment unit 111 to generate two-phase reaction product 115). For example, when NaOH is used as base 113, sodium atoms react with hydroxyl ions from water at the cathode of first electrochemical cell 123 to form regenerated NaOH. This regenerated base 127 can be recovered and returned to the treatment unit 111 for extraction of insoluble lead paste 109 as part of a closed loop system. Similarly, sulfuric acid can be recovered from the anode of first electrochemical cell 123, and subsequently used in any number of industrial processes. In a preferred embodiment, the recovered sulfuric acid 125 is utilized in the manufacture of lead acid batteries via new battery assembly unit 107. Additionally, recyclable water is generated that can be recycled or reused in electrochemical flow cell 123 or in another process.

First electrochemical cell 123 can comprise a plurality of anode segments, a plurality of cathode segments, and a separator or disposed between the plurality of anode segments and the plurality of cathode segments. Suitable separators for first electrochemical cell 123 comprise a cation exchange membrane, an anion exchange membrane, or an electrodialysis membrane. It is contemplated that a controller can be electronically coupled to first electrochemical cell 123 to control current at the plurality of anode segments and the plurality of cathode segments as a function of a concentration of the soluble sulfate salt. Thus, single-pass processing through first electrochemical cell 123 is at high efficiency to substantially, or completely, convert the soluble sulfate salt in supernatant 119 to sulfuric acid 125 and regenerated base 127. An exemplary contemplated electrochemical cell having a segmented electrode is described in U.S. Pat. No. 8,580,414. However, it should be noted that such cell was used as a redox flow battery or a redox reactor for complete consumption of reactants in a redox reaction. Viewed from another perspective, first electrochemical cell 123 is used to split water and to generate base 113 and sulfuric acid 125 from the soluble sulfate solution.

As shown in FIG. 1, following separation in separation unit 117, precipitate 121 can be processed to provide metallic lead. To accomplish this, precipitate 121 produced by treatment unit 111 is dissolved in a solvent capable of solvating lead hydroxide and lead oxide(s), and that is stable to conditions used for electrodeposition. For example, precipitate 121 can be contacted with alkane sulfonic acid 122 (e.g., methanesulfonic acid) in a solvation unit 129 to generate a mixture comprising a lead ion solution and insoluble lead dioxide. Other suitable solvents include perchlorates, amidosulfonates, hexafluorosilicates, tetrafluoroborates, and/or pyrophosphates.

It is contemplated that the solvent can be provided as a solution in water. In such solutions, the lead solvating species can range in concentration from 1 wt % to 50 wt %, and even higher. In a further preferred embodiment of the inventive concept, it should be appreciated that the solvent does not require additional materials to enhance lead solubility, such as chelating agents (e.g., ethylenediaminetetraacetic acid or EDTA), which are expensive, can break down during electrodeposition, and may lead to an increasing concentration of breakdown products in the solvent on repeated regeneration and re-use.

With respect to alkane sulfonic acid 122, it should be appreciated that numerous alkane sulfonic acids are deemed suitable for use herein. However, methanesulfonic acid is especially preferred as this compound is environmentally friendly and stable under electrolytic conditions used. Other suitable alkane sulfonic acids include ethyl sulfonate, proplyene sulfonate, trifluro methyl sulfonate (triflic acid), sulfamic acid, etc. In most circumstances, the methanesulfonic acid or other alkane sulfonic acid will be present in a significant concentration in an electrochemically stable solvent, typically at least 1-5 wt %, more typically 5-15 wt %, even more typically 25-50 wt %, and most typically between 10 and 35 wt %. Thus, suitable concentrations will typically be between 5 and 50 wt %, or between 20 and 30 wt % of the electrochemically stable solvent. The pH of the electrochemically stable solvent is most preferably acidic, and most typically between pH 5-7, or between pH 1-3, or between pH 3-5. Viewed form a different perspective, the pH of the electrochemically stable solvent will be less than 7, or equal or less than 5, or equal or less than 3.

Insoluble lead dioxide 124 can be readily isolated from the mixture comprising a lead ion solution and insoluble lead dioxide via filtration, sedimentation, centrifugation, etc., and can be further processed in a second treatment unit 126 in which insoluble lead dioxide 124 is contacted with a reducing agent 128 to convert insoluble lead dioxide 124 to lead oxide. Most preferably, reducing agent 128 can be various organic acids (e.g., oxalate, dicarboxylic acids (oxalic acid)), hydrogen peroxide, metallic lead, sulfite (e.g., sodium sulfite), hydrazine sulfate, gaseous sulfur dioxide (fed to an aqueous solution) and sodium dithionate. For example, where the reducing agent is sodium sulfite, the reduction reaction will yield lead oxide and sodium sulfate. So generated sodium sulfate can be combined with the sodium sulfate obtained from the desulfurization reaction for recycling in the process, while the lead oxide may be combined with insoluble lead paste 109 or an aqueous base to form more lead hydroxide in the process.

It should be appreciated that lead dioxide present in insoluble lead paste 109 may also be reduced prior to the desulfurization in treatment unit 111 to form a pre-treated lead paste that has a significantly reduced concentration of lead dioxide (e.g., residual lead dioxide equal or less than 5 mol %, or equal or less than 2 mol %, or equal or less than 0.5 mol %, or equal or less than 0.1 mol % of all lead species in the pre-treated insoluble lead paste 109). Pretreatment is typically done using a reducing agent that is suitable to form lead oxide from lead dioxide, and especially suitable reducing agents include hydrogen peroxide, gaseous sulfur dioxide (fed to an aqueous solution), various organic acids (e.g., oxalate, dicarboxylic acids (oxalic acid)), hydrazine sulfate, metallic lead, sulfite (e.g., sodium sulfite), and sodium dithionate. For example, hydrogen peroxide will reduce lead dioxide and yield lead oxide and water, and where the reducing agent is sodium sulfite, the reduction reaction will yield lead oxide and sodium sulfate. Alternatively, the lead dioxide may also be reduced in the lead ion solution using peroxide or other reducing agent in solvation unit 129.

When pre-treating insoluble lead paste 109 to reduce lead dioxide to lead oxide, it should be appreciated that the process steps of desulfurization in treatment unit 111 and separation of supernatant 119 and precipitate 121 remain the same as described herein. The precipitate in the pre-treatment of lead dioxide embodiment is fed to a solvation unit that receives an alkane sulfonic acid to thereby generate a lead ion solution. The lead ion solution is fed to an electrochemical cell to recover lead. Advantageously, there is no need to separate insoluble lead dioxide after treatment with an alkane sulfonic acid to reduce the lead dioxide to lead oxide because the lead dioxide is reduced prior to desulfurization. Thus, pre-treatment of insoluble lead paste 109 to reduce lead dioxide to lead oxide can simplify the process.

Additionally, it is contemplated that a recycling process can have both pre-treatment of insoluble lead paste 109 and second treatment unit 126 to reduce lead dioxide to lead oxide in a two stage process. For example, pre-treatment of insoluble lead paste 109 can be used as a first reduction stage to reduce lead dioxide to lead oxide, and second treatment unit 126 can be used as a second reduction stage to reduce any remaining lead dioxide.

The lead oxide is typically combined with the lead ion solution to form a combined lead ion solution. For example, lead oxide 130 can be fed to a second electrochemical cell 135 to combine with a lead ion solution 133 from solvation unit 129 to form a combined lead ion solution in second electrochemical cell 135. Alternatively, lead oxide 132 can be fed directly to solvation unit 129 to combine with the lead ion solution and form a combined lead ion solution that is fed to second electrochemical cell 135. Additionally, or alternatively, lead oxide 134 can be fed to a second solvation unit 136 that receives a second alkane sulfonic acid 138 to thereby generate a second lead ion solution 140. Second lead ion solution 140 can be combined with lead ion solution 133 in second electrochemical cell 135 to form a combined lead ion solution. It should be appreciated that undissolved material is typically removed from lead ion solution 133 and/or second lead ion solution 140. Undissolved material that is removed comprises at least one of metallic lead and plastic.

Second electrochemical cell 135 comprises a cathode that is in contact with the combined lead ion solution as shown below. An electrical potential can be applied to the cathode to thereby continuously form adherent lead 139 on a first portion of the cathode and to generate regenerated alkane sulfonic acid 137. Regenerated alkane sulfonic acid 137 can be recycled to solvation unit 129 to treat additional precipitate 121. In some embodiments, alkane sulfonic acid 122 can be substantially reduced, or eliminated, due to recycling regenerated alkane sulfonic acid 137 in sufficient quantities to contact precipitate 121. Additionally, or alternatively, regenerated alkane sulfonic acid 137 can also be fed to second solvation unit 136, and in some embodiments, can replace second alkane sulfonic acid 138.

Solvated lead ions ($Pb^{2+}$) are preferably recovered using an electrodeposition process, for example electroplating or electrowinning. In such processes, adherent lead 139 collects on one or more cathodes that are in contact with the combined lead ion solution. Any suitable electrodeposition device can be used. In some embodiments, the cathode or cathodes can be configured to move relative to the combined lead ion solution, advantageously permitting access to and recovery of metallic lead during the electrodeposition process. Thus, adherent lead 139 can be removed from a second portion of the cathode while continuously forming adherent lead on the first portion of the cathode to advantageously provide a continuous operation. For example, a collection cathode can be configured as a moving conductive belt or wire that passes through the combined lead ion containing solution, and then through a device that collects metallic lead from the cathode surface. In a preferred embodiment, a cathode is configured as a rotating disc oriented perpendicular to the surface of the combined lead ion solution and partially submerged therein. Access is provided to deposited lead via rotation of the rotating disc. Such rotating disc electrodes can rotate at 0.1, 0.3, 1, 3, or 10 or more rpm.

Current applied to the cathode is, among other parameters, a function of the cathode's surface area and lead ion concentration, and can range from 100 $A/m^2$ to 2000 $A/m^2$. In some embodiments (for example, continuous processes), the current applied to the cathode is held constant. In other embodiments of the inventive concept, the current applied to the cathode is varied as electrodeposition progresses. In order to facilitate collection of deposited lead metal in some embodiments the collection cathode has a surface to which the deposited metallic lead does not strongly adhere. Such an adhesion permits collection of metallic lead by a straightforward wiping mechanism, such as a blade or scraper that is positioned at or near the second portion of the cathode to collect lead or an aperture with an edge that is similarly positioned. Collection of the deposited lead metal can be continuous (i.e., throughout electrodeposition) or intermittent. A reduced adhesion surface can be provided by application of an adhesion reducing layer to the surface of a collection cathode or can be provided by the material of the cathode itself. In a preferred embodiment, the cathode is made of aluminum or has an aluminum surface, where the aluminum oxide layer that forms on exposure to air provides a surface with reduced adhesion.

It should be appreciated that the cathode of the inventive concept can be constructed of a single material (e.g., aluminum) or can be constructed as a composite. For example, the cathode can be constructed of a conductive core material (e.g., steel, copper, graphite, and/or conductive polymer) and a conductive but non-adhesive outer material (e.g., aluminum and the attendant coating of aluminum oxide). Alternatively, the cathode can have a non-conductive core (e.g., polymer/plastic, cellulosic material, and/or fiberglass/resin material) that is clad or otherwise coated with a non-adhesive and conductive outer layer (e.g., aluminum and the attendant coating of aluminum oxide). Thus, it is contemplated that the cathode comprises aluminum, an aluminum alloy, or an aluminum powder embedded in a plastic.

Surprisingly, the inventors have found that when aluminum is used as the cathode, lead is not deposited as a cohesive, adherent layer on the cathode surface. Rather, lead was found to deposit on the cathode as a loose, slightly adherent, amorphous dark mass. On examination, the collected lead was found to have lower density than traditional metallic lead (11.34 $g/cm^3$). The density of the collected material was found to range from 5 $g/cm^3$ to less than 1 $g/cm^3$, with the lower density material readily collectable by flotation. When pressure was applied to the amorphous mass, it was found to compress easily and to gain a metallic sheen. Without wishing to be bound by theory, the inventors believe that in processes of the inventive concept metallic lead deposits on an aluminum cathode in a dendritic fashion rather than as continuous, adhesive surface layer, and in doing so traps hydrogen gas that is generated during the deposition process. This results in the formation of a porous amorphous mass of metallic lead that is readily gathered from the cathode. It should also be appreciated that the incorporation of hydrogen into the mass serves to prevent (for the majority of the lead so collected) the formation of unwanted lead oxides through the interior of the amorphous mass. Most notably, so recovered metallic lead has a substantial purity, typically at least 99.9%, more typically at least 99.99%, and most typically at least 99.999%.

Figure 2:
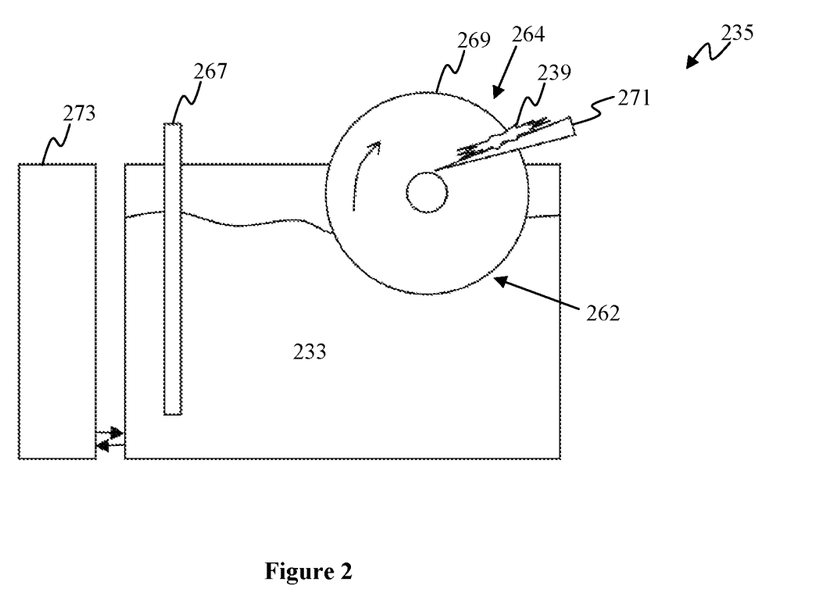
FIG. 2 is an exemplary schematic of an embodiment of an electrochemical cell comprising a rotating cathode.

One contemplated electrochemical cell 235 for recovering lead is shown in FIG. 2. Electrochemical cell 235 contains a combined lead ion solution 233. An anode 267 and a rotating disk-shaped cathode 269 are at least partially disposed in electrochemical cell 235 to contact combined lead ion solution 233, and to promote formation of lead 239 in a first portion 262 of cathode 269 that is taken up by scraper 271 (typically a plastic wiper or otherwise proximally positioned surface) in a second portion 264 of cathode 269. Typically, first portion 262 of cathode 269 the portion of cathode 269 that is in contact with combined lead ion solution 233 to form metallic lead while second portion 264 of cathode 269 is near a wiping mechanism (e.g., scraper 271) that preferably not in contact with combined lead ion solution 233. However, it is contemplated that both first portion 262 and second portion 264 of cathode 269 are both in contact with combined lead ion solution 233, such that a wiping mechanism is also in contact with combined lead ion solution 233 to collect lead. In some embodiments, anode 267 is made from titanium and is coated with ruthenium oxide and cathode 269 is aluminum.

Of course, it should be appreciated that the inventive subject matter is not limited to use of a disk-shaped electrode, but that in fact all electrodes are deemed suitable that allow active (e.g., using a wiping blade or surface) or passive removal (e.g., via bubbles, solvent jetting, or flotation) of high-purity lead from cathode 269. Thus, suitable electrodes may be configured as simple plates that may be static relative to the solvent or moved in a reciprocal manner, or electrodes that can be continuously moved and that are configured to allow reduction of lead ions on one portion and lead removal on another portion. For example, suitable electrode configurations include conductive disks, cylinders, spheres, belts, etc. Likewise, it should be recognized that the number of cathodes may vary considerably, and that most typically multiple cathodes are operated in parallel (or serially, especially where the cathodes are static relative to the solvent.

A solvent conditioning unit 273 for removal of sulfate can be coupled to electrochemical cell 235 to receive spent solvent and provide back conditioned solvent in embodiments where removal of accumulated sulfate as well as other impurities (e.g., $Sn^{2+}$, $Ca^{2+}$, particulates, etc.) from the electroprocessing solvent is needed. Solvent processing can be performed in numerous manners and may be continuous or batch-wise. Most typically, processing the solvent includes a step of filtering to remove at least some of the particulates, a step of sulfate removal (e.g., via lime precipitation, reverse osmosis, ion exchange, electro-osmosis, salt splitting, liquid chromatography, liquid/liquid extraction etc.), and/or a step of non-lead metal ion removal (e.g., ion exchange). Where the process is operated in a batch mode, collection of multiple streams of solvent is especially preferred, and a surge or holding tank may therefore be added to the system. On the other hand, where the system is continuously operated, multiple streams may be combined and then processed to reduce redundancy and plot space.

As described above, it was unexpectedly observed that the reduced lead ions did not form a tightly bonded film on cathode 269, but could be readily removed from cathode 269 by simply wiping cathode 269 with a material to which the lead could adhere (e.g., plastic, lead-film, etc.). Therefore, lead recovery can be performed in a continuous manner. Particularly where a rotating or reciprocating electrode was employed, lead ions could be reduced one part of an electrode or electrode assembly, while metallic lead can be removed from another part of the electrode or electrode assembly.

It is contemplated that cathode 269 moves relative to the combined lead ion solution while the electrical potential is applied. For example, cathode 269 exhibits rotational movement while the electrical potential is applied, such that the lead deposited on the cathode is removed from the combined lead ion solution.

Viewed from another perspective, a method of recycling lead from a desulfurized lead paste of a lead acid battery in a continuous process is contemplated. The desulfurized lead paste is contacted with an alkane sulfonic acid to generate a mixture comprising a lead ion solution and an insoluble lead dioxide. The insoluble lead dioxide is separated from the lead ion solution and converting the insoluble lead dioxide to lead oxide, and combined with the lead ion solution to form a combined lead ion solution. An electrical potential is applied to a cathode in contact with the combined lead ion solution to thereby continuously form adherent lead on a first portion of the cathode and to generate regenerated alkane sulfonic acid. Lead is removed from a second portion of the cathode while continuously forming lead on the first portion of the cathode. It should be appreciated that the insoluble lead dioxide is converted to lead oxide in an amount sufficient to substantially avoid accumulation of the insoluble lead dioxide in the continuous process. Thus, the subject matter described above is also applicable to lead paste that was previously desulfurized.

It should be appreciated that the described processes can be performed in a batch manner, in which a single bolus of lead paste is processed to produce a discrete batch of soluble sulfate salt and a discrete batch of lead-containing precipitate. Using suitable separation methods, however, processes of the inventive concept can be performed in a continuous fashion, with a stream of lead paste being processed to produce streams of sulfuric acid and precipitate. In some embodiments processes of the inventive concept can be performed in a semi-continuous manner, for example by providing discrete boluses of lead paste in succession. Moreover, it should be appreciated that the devices, systems, and methods provided herein allow for simplified lead recovery from lead paste in a process that simultaneously allows for sulfate removal.

It should also be appreciated that methods and reagents of the inventive concept, while described above in terms of recycling of lead acid batteries, can also be applied to the recovery of sulfate from other sources. Suitable alternative sources include sulfate-containing salts with corresponding insoluble hydroxides or, alternatively, unstable hydroxides that form insoluble oxides. Examples of sulfate-containing materials from which sulfate can be extracted include materials that include sulfate salts of Group II elements, transition metals, and aluminum. Still further, while electrochemical recovery of metallic lead from lead ion solutions is particularly preferred, further clean-up of the lead ion solutions (e.g., via ion exchange materials) to produce highly pure lead salts is also contemplated.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced

What is claimed is:

1. A method of recovering lead from a lead paste of a lead acid battery, wherein the lead paste comprises lead sulfate, the method comprising:
   contacting the lead paste with a base to thereby generate a supernatant comprising a soluble sulfate salt and a precipitate comprising an insoluble lead salt;
   separating the supernatant from the precipitate;
   contacting the precipitate with alkane sulfonic acid to generate a mixture comprising a lead ion solution and insoluble lead dioxide;
   contacting the insoluble lead dioxide in the precipitate or in the lead paste with a hydrogen peroxide to thereby reduce lead dioxide to lead oxide;
   combining the lead oxide with the lead ion solution to form a combined lead ion solution;
   applying an electrical potential to a cathode in contact with the combined lead ion solution to thereby continuously form adherent lead on a first portion of the cathode and to generate regenerated alkane sulfonic acid;
   wherein the adherent lead has a purity of at least 99.9%; and
   removing the adherent lead from a second portion of the cathode while continuously forming adherent lead on the first portion of the same cathode.

2. The method of claim 1, wherein the base is added in an amount sufficient to produce the supernatant comprising the soluble sulfate salt and the precipitate comprising the insoluble lead salt and to produce less than 0.1 mol % plumbate from the lead paste.

3. The method of claim 1, wherein the base comprises at least one of an alkali or alkaline earth metal hydroxide and a carbonate, and the insoluble lead salt comprises at least one of a lead oxide, a lead hydroxide, and a lead carbonate.

4. The method of claim 1, wherein the soluble sulfate salt comprises sodium sulfate, the base comprises sodium hydroxide, and the insoluble lead salt comprises lead hydroxide.

5. The method of claim 1, wherein the separating the supernatant from the precipitate is performed by at least one of settling, centrifugation, and filtration.

6. The method of claim 1, wherein the precipitate is substantially free of sulfate.

7. The method of claim 1, wherein the alkane sulfonic acid comprises methanesulfonic acid.

8. The method of claim 1, wherein the cathode exhibits rotational movement while the electrical potential is applied, such that the lead deposited on the cathode is removed from the combined lead ion solution.

9. The method of claim 1, wherein removing the adherent lead further comprises positioning a scraper near or at the second portion of the cathode to remove lead.

10. The method of claim 1, wherein the cathode comprises aluminum, an aluminum alloy, or an aluminum powder embedded in a plastic.

11. The method of claim 1, further comprising electrolyzing the supernatant comprising the soluble sulfate salt to produce a regenerated base and sulfuric acid.

12. The method of claim 11, wherein at least some of the base in the step of contacting the lead paste comprises the regenerated base.

13. The method of claim 1, wherein the combining the lead oxide further comprises feeding the lead oxide to the lead ion solution to thereby form the combined lead ion solution.

14. The method of claim 1, wherein the combining the lead oxide further comprises contacting the lead oxide with a second portion of the alkane sulfonic acid to thereby generate a second lead ion solution, and combining the lead ion solution and the second lead ion solution to form the combined lead ion solution.

* * * * *